May 12, 1953      G. E. GARD      2,638,529
METHOD AND APPARATUS FOR DIELECTRIC HEATING
Filed July 21, 1952
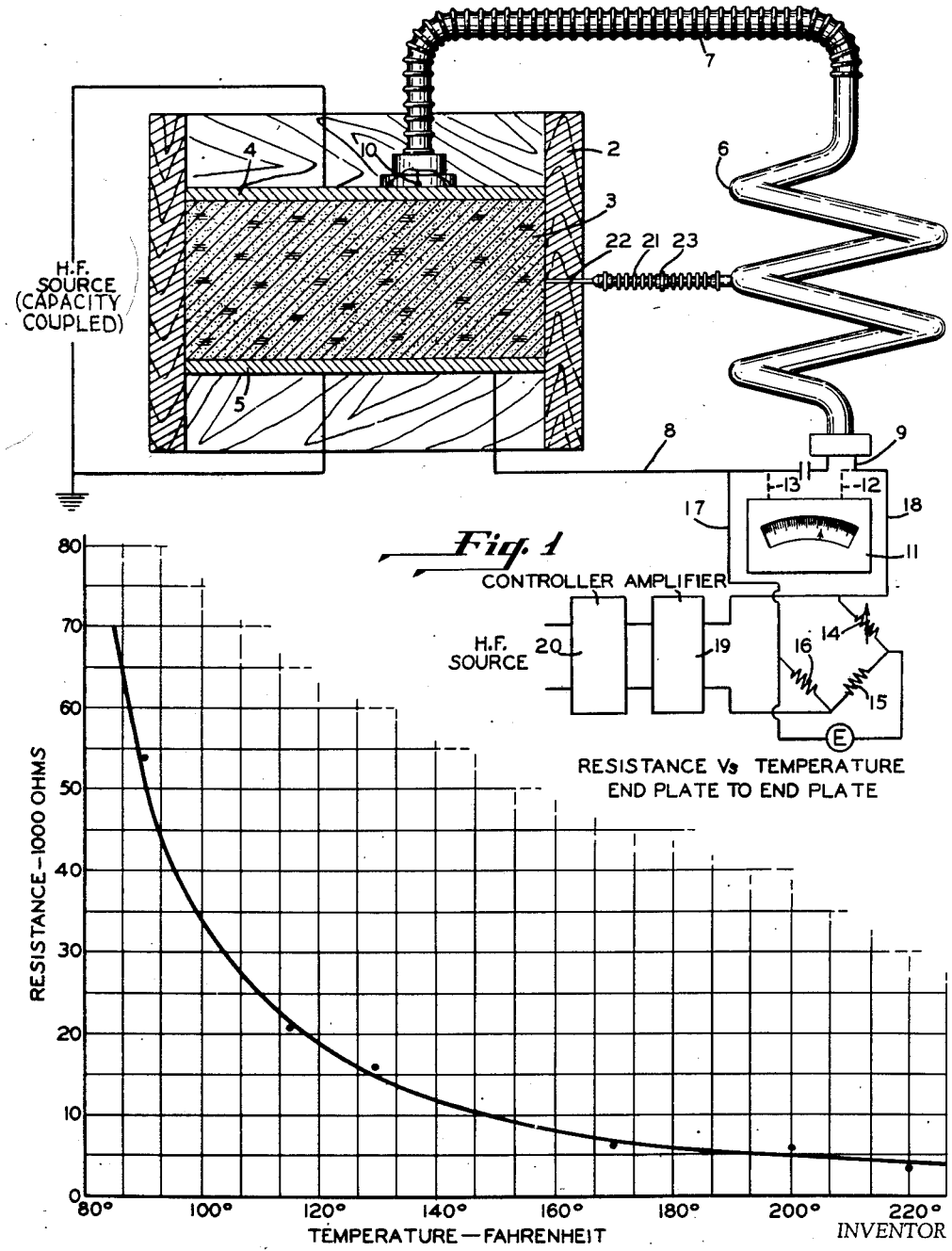
INVENTOR
GEORGE E. GARD
ATTORNEY Patented May 12, 1953

2,638,529

UNITED STATES PATENT OFFICE 2,638,529

METHOD AND APPARATUS FOR DIELECTRIC HEATING

George E. Gard, East Hempfield Township, Lancaster County, Pa., assignor to Armstrong Cork Company, Lancaster, Pa., a corporation of Pennsylvania Application July 21, 1952, Serial No. 300,075

9 Claims. (Cl. 219—47)

This invention relates to a method and apparatus for dielectric heating and is concerned particularly with a method and apparatus for dielectrically heating materials which are confined within a mold, such as cork compositions.

In the manufacture of cork composition utilizing a heat-activatable binder and dielectrically heating, the cork granules are thinly coated with the binder material and are charged into a mold. The mass is compressed within the mold, and then a high-frequency alternating electric field is established within the mass, causing the temperature thereof to be elevated and the binder to be activated. The heating effect is extremely rapid, and one of the problems involved in dielectric heating of cork composition and the like is to avoid overheating. If the temperature reaches too high a degree, the binder may be degraded and charring may even occur. Also, too high a temperature may result in an undesirable increase in vapor pressure within the mold, militating against rapid setting of the cork granules, as disclosed in my Patent No. 2,601,702.

A method of controlling the application of the field to the mass and for interrupting it when the mass attains a desired maximum temperature is disclosed in my Patent No. 2,508,382. In that patent, the temperature of the mass under treatment in the mold is determined by a thermocouple or other heat-responsive device disposed within a probe which is inserted directly within the mass. This thermocouple is electrically connected with control equipment effective for discontinuing the application of the field to the mass upon the attainment of a predetermined temperature within the mass.

It is recognized, as disclosed in George W. Scott, Jr. Patent No. 2,526,697, that as the temperature of a mass under dielectric treatment increases, its rate of heating increases; and thus there is a so-called "snow-balling" or "avalanche" effect, causing an accelerated rate of heating which may rapidly become uncontrollable. It is desirable, therefore, to have the control equipment responsive instantaneously and continuously to the temperature of the mass. With any probe type heat-responsive device there is inevitably a time lag in response, because it is necessary to transfer heat from the mass to the thermocouple or other temperature-responsive element through the probe structure.

Where there is any tendency for certain portions of the mass to heat at a different rate than other portions, it is desirable to effect the control of the field in accordance with the average temperature of the whole of the mass or at least a substantial portion of it. This is not possible with the probe type thermocouple system which is responsive only to local temperatures at or adjacent to the area into which the probe is inserted.

Another problem involved in the use of a probe type device is the necessity for making the probe of very small size in order to permit its insertion into a compressed mass. Mechanical inserting equipment is necessary for mass production operation, and considerable rigidity in the probe structure is thus required. If the probe is of large size, an objectionable opening is left in the finished product, requiring the scrapping of a portion of it.

An object of the invention is to provide a method and apparatus for dielectric heating in which the electrical impedance of the mass under treatment, which impedance varies as the temperature of the mass changes, is employed to control the dielectric heating, especially to discontinue the application of the high-frequency field to the mass when a desired temperature has been reached within the mass.

Another object of the invention is to provide a control for dielectric heating which will be responsive to the average temperature of the mass under treatment or a substantial portion thereof at least.

A further object of the invention is to provide for dielectric heating control which is responsive substantially instantaneously to the average temperature of at least a substantial portion of the mass undergoing dielectric heating.

Other objects of the invention will become apparent from consideration of the description of a preferred embodiment of the invention which follows.

According to my invention, the varying electrical impedance of the mass with temperature changes therein is utilized to measure the average temperature of a substantial portion at least of the mass and when a predetermined impedance value is reached, the high-frequency field which is effecting heating of the mass is discontinued. Preferably, the impedance of the mass is utilized to initiate, electrically, proper controls for discontinuing the field. A Wheatstone's bridge circuit including the mass as one of the impedance arms of the bridge, with the bridge circuit so arranged that a predetermined unbalancing thereof will actuate a control device such as a relay after suitable amplification, provides a relatively simple and effective control arrangement.

In order that the invention may be readily understood, certain preferred embodiments will be described in conjunction with the attached drawing, in which:

Figure 1 is a diagrammatic and schematic view of a mold arrangement for dielectrically heating a mass of cork composition; and Figure 2 is a graph showing the relationship of resistance and temperature with a mass of cork composition.

Referring to Figure 1, there is shown a mold 2 having walls of wood which may be impregnated with a waterproofing impregnant such as ceresin wax, as more fully described in George W. Scott, Jr., Patent No. 2,526,698. A mass of cork composition 3 is disposed within the mold 2 and is held under compression therein by end plates 4 and 5 which constitute electrodes capacitively coupled to a high-frequency source as noted. A tuning coil 6 is connected to the electrodes 4 and 5, the coil being preferably formed of tubular conductor with a flexible section 7 to permit the upper electrode 4 to be removed from within the mold 2 to permit charging and discharging of the mold. The opposite end of the coil 6 is capacitively coupled to the electrode 5 by lead 8.

It is well known that high-frequency current will flow in the outer skin surface of a conductor, and thus it is possible to dispose control leads within the tubular conductor 6 where they will be completely shielded from the high-frequency current. In the embodiment illustrated, a lead 9 extends through the conductor 6 and is connected at 10 to the upper electrode 4. Lead 9 may be connected to an ohmmeter 11 by a lead 12, and the other end of the ohmmeter may be connected by a lead 13 to lead 8 from tuning coil 6 and electrode 5. The ohmmeter indicates the resistance of the mass 3 from end plate or electrode 4 to end plate or electrode 5. Where automatic control is to be effected, an ohmmeter is not needed but may be plugged into the circuit when it is desired to read the resistance.

An automatic control system is schematically shown in Figure 1 in which a Wheatstone's bridge circuit is provided including a variable resistance 14 and two fixed resistances 15 and 16. A lead 17 connected to the lead 8 and a lead 18 connected to lead 9 electrically connect the mass 3 between the electrodes 4 and 5, and the mass 3 thus constitutes the fourth and final arm of the bridge circuit. A source of energizing voltage E is applied to the system in the conventional manner, and the output is fed through an amplifier 19 into a controller 20 which may include a relay effective for controlling the application of current to the electrodes 4 and 5 from the high-frequency source. Thus, the application of the high-frequency electric field from the high-frequency source through the electrodes 4 and 5 to the heated dielectric mass 3 is controlled directly in accordance with a decrease in the impedance of the heated dielectric mass 3 to the flow of current from the source of energizing voltage E. This control may be accomplished in any number of ways as, for instance, by interrupting the input to the high-frequency oscillator or by interrupting the output to the electrodes. The bridge circuit will be so arranged and set that upon reduction of the impedance of the mass 3 to a predetermined value, the controller will be initiated and the supply of current to the electrodes discontinued. For instance, in the production of a cork composition made of the following formulation, it may be desirable to interrupt the supply of high-frequency current when the mass reaches a temperature of 190° F. to 200° F.

|  | Parts by weight |
| --- | --- |
| Cork (5 to 10 mesh U. S. Standard) | 100.0 |
| Glue | 6.5 |
| Glycerin | 20.0 |
| Water | 2.5 |
| Paraformaldehyde | .52 |

Referring to Figure 2 which is a graph of resistance vs. temperature for the above-identified cork composition, it will be noted that as the temperature of the mass increases, the resistance in ohms decreases; and when the mass reaches the desired temperature of 190° F. to 200° F., the resistance has fallen to about 6500 ohms. The equipment will be adjusted in such fashion that the controller 20 will be actuated through the bridge circuit when the resistance reaches about 6500 ohms, and thus the average temperature of the mass throughout the whole of its volume will be approximately 190° F. to 200° F. If it is desired to interrupt the supply of high-frequency current at a higher or lower temperature, the system may be easily and quickly adjusted to make this effective.

The decrease in impedance as the temperature increases will vary with the particular material under treatment. It will be necessary, therefore, to calculate the impedance and temperature factors for any type of material to be treated and to set the control equipment accordingly.

Instead of utilizing the average temperature of the whole mass for control through changes in impedance of the mass, the lead 9 may be disposed through a flexible tube 21 having a projecting tip 22 adapted to be received through an opening provided in the mold 2. The end of the tip 22 is adapted to lie in engagement with the mass 3 within the mold, and the lead 9 is electrically connected to the tip. In this system, the flexible tube 21 and the tip 22 being disposed in the median plane between the electrodes 4 and 5 will not be affected by the high-frequency current. In order to prevent the flow of direct current while permitting any stray high-frequency fields to pass through the tube 21 to ground, it may be formed in two sections as indicated with an insulating spacer 23 disposed therebetween. This type of conductor is more fully described in my Patent No. 2,508,382 referred to above. With this arrangement, the connection of the lead 9 with the upper electrode 4 at 10 will not be made. The impedance of the mass 3 from lower electrode 5 to tip 22 will be utilized as the high-frequency control. While it is preferred to connect the leads to the end plates and thus obtain the average impedance of the whole of the mass, the modified arrangement does provide for control in accordance with the average impedance and temperature of a substantial portion of the mass and is quite acceptable.

This application is a continuation in part of my copending application Serial No. 163,748, filed May 23, 1950 now abandoned.

I claim:

1. In a method of dielectrically heating a mass of material, the steps comprising disposing between spaced electrodes a mass of dielectric material which decreases in electrical impedance as its temperature increases, applying a high-frequency alternating electric field between said electrodes from a source of high-frequency voltage to heat said dielectric mass and decrease its electrical impedance, applying an energizing control voltage directly to said heated dielectric mass at spaced points embracing a substantial portion at least thereof, and controlling the application of said high-frequency electric field to said heated dielectric mass directly in accordance with a decrease in the impedance of said heated dielectric mass to the flow of current from said energizing control voltage which occurs as the temperature of said dielectric mass increases.

2. In a method of dielectrically heating a mass of material, the steps comprising disposing between spaced electrodes a mass of dielectric material which decreases in electrical impedance as its temperature increases, applying a high-frequency alternating electric field between said electrodes from a source of high-frequency voltage to heat said dielectric mass and decrease its electrical impedance, applying an energizing control voltage directly to said heated dielectric mass at spaced points embracing substantially the whole thereof, and controlling the application of said high-frequency electric field to said heated dielectric mass directly in accordance with a decrease in the impedance of said heated dielectric mass to the flow of current from said energizing control voltage which occurs as the temperature of said dielectric mass increases.

3. In a method of dielectrically heating a dielectric mass of cork composition including cork granules and a heat-convertible binder, the steps comprising placing under compression in a mold a mass of said cork composition which decreases in electrical impedance as its temperature increases, applying to said dielectric mass of compressed cork composition a high-frequency alternating electric field from a source of high-frequency voltage to heat said dielectric mass of compressed cork composition and decrease its electrical impedance, applying an energizing control voltage directly to said heated dielectric mass of compressed cork composition at spaced points embracing a substantial portion at least thereof, and controlling the application of said high-frequency electric field to said heated dielectric mass of compressed cork composition directly in accordance with a decrease in the impedance of said heated dielectric mass of compressed cork composition to the flow of current from said energizing control voltage which occurs as the temperature of said dielectric mass of compressed cork composition increases.

4. In a method of dielectrically heating a mass of material, the steps comprising disposing between spaced electrodes a mass of dielectric material which decreases in electrical impedance as its temperature increases, applying a high-frequency alternating electric field between said electrodes from a source of high-frequency voltage to heat said dielectric mass and decrease its electrical impedance, applying an energizing control voltage directly to said heated dielectric mass at spaced points embracing a substantial portion at least thereof, and discontinuing the dielectric heating of said dielectric mass upon a predetermined decrease in the impedance of said heated dielectric mass to the flow of current from said energizing control voltage which occurs as the temperature of said dielecttric mass increases.

5. Apparatus for dielectrically heating a mass of dielectric material which decreases in electrical impedance as its temperature increases comprising: a pair of electrode plates between which a mass of dielectric material which decreases in electrical impedance as its temperature increases is disposed for dielectric heating, means connecting said electrodes to a source of high-frequency voltage to establish a high-frequency alternating electric field embracing said dielectric mass to heat the same, and means for controlling the application of said field to said dielectric mass comprising: a source of energizing control voltage, means directly connecting said dielectric mass to said source of energizing control voltage at spaced points embracing a substantial portion at least of said dielectric mass, and an electrical control responsive to decrease in the impedance of said heated dielectric mass to the flow of current from said energizing control voltage for controlling the high-frequency voltage applied to said electrodes.

6. Apparatus for dielectrically heating a mass of dielectric material which decreases in electrical impedance as its temperature increases comprising: a pair of electrode plates on opposite sides of said mass connected to a source of high-frequency alternating voltage to establish a high-frequency alternating electric field embracing said dielectric mass to heat the same and means for controlling the application of said field to said dielectric mass comprising: a source of energizing control voltage, means directly connecting said dielectric mass to said source of energizing control voltage at spaced points embracing a substantial portion at least of said dielectric mass, and an electrical control responsive to decrease in the impedance of said heated dielectric mass to the flow of current from said energizing control voltage for discontinuing the application of said high-frequency voltage to said electrodes when said dielectric mass has attained a desired average temperature.

7. Apparatus for dielectrically heating a mass of dielectric material which decreases in electrical impedance as its temperature increases comprising: a pair of electrode plates between which a mass of dielectric material which decreases in electrical impedance as its temperature increases is disposed for dielectric heating, means connecting said electrodes to a source of high-frequency voltage to establish a high-frequency alternating electric field embracing said dielectric mass to heat the same, and means for controlling the application of said field to said dielectric mass comprising: a source of energizing control voltage, means directly connecting said dielectric mass to said source of energizing control voltage at spaced points embracing a substantial portion at least of said dielectric mass, and means responsive to decrease in the impedance of said dielectric mass to the flow of current from said energizing control voltage for discontinuing the application of said high-frequency voltage to said electrodes including an impedance bridge, one leg of which is constituted by said mass of dielectric material, an amplifier coupled to said bridge, and an electrical control device coupled to said amplifier and responsive to the attainment of a predetermined unbalanced condition in said bridge.

8. Apparatus for dielectrically heating a mass of cork composition including cork granules and a heat-convertible binder, which mass decreases in electrical impedance as its temperature increases, comprising: a mold of dielectric material, a pair of electrode plates disposed within the mold for contact with opposite sides of said dielectric mass of cork composition which decreases in electrical impedance as its temperature increases, means connecting said electrodes to a source of high-frequency voltage to establish a high-frequency alternating electric field embracing said dielectric mass of cork composition to heat the same, and means for controlling the application of said field to said dielectric mass of cork composition comprising: a source of energizing control voltage, means directly connecting said dielectric mass of cork composition to said source of energizing control voltage at spaced points embracing substantially the whole of said dielectric mass of cork composition including leads from said source connected to each of said electrodes, and means responsive to a predetermined decrease in the impedance of said heated dielectric mass of cork composition to the flow of current from said energizing control voltage for discontinuing the application of said high-frequency voltage to said electrodes.

9. Apparatus in accordance with claim 5 in which the energizing control voltage is applied to one of said electrodes and directly to said mass of dielectric material at substantially the median transverse plane between said electrodes.

GEORGE E. GARD.

No references cited.